United States Patent [19]
Rittof et al.

[11] Patent Number: 5,174,859
[45] Date of Patent: Dec. 29, 1992

[54] METHOD FOR TREATING MECHANICAL PULP PLANT EFFLUENT

[75] Inventors: Timothy J. Rittof, Lombard; Jean-Claude Patel, Aurora, both of Ill.

[73] Assignee: HPD Incorporated, Naperville, Ill.

[21] Appl. No.: 683,244

[22] Filed: Apr. 10, 1991

Related U.S. Application Data

[63] Continuation-in-part of Ser. No. 508,041, Apr. 11, 1990, abandoned.

[51] Int. Cl.⁵ .............................................. B01D 9/04
[52] U.S. Cl. ......................................... 162/29; 162/54; 162/189; 159/DIG. 5; 62/541; 210/774
[58] Field of Search ....................... 162/29, 42, 43, 54, 162/189; 210/774; 159/DIG. 5; 62/532, 541, 542

[56] References Cited

U.S. PATENT DOCUMENTS

| | | | |
|---|---|---|---|
| 1,396,028 | 11/1921 | Dickerson | 159/DIG. 5 |
| 3,558,426 | 1/1971 | Hess | 210/774 |
| 3,987,641 | 10/1976 | Lee | 162/29 |
| 4,092,834 | 6/1978 | Lloyd | 62/123 |
| 4,199,961 | 4/1980 | Carter et al. | 62/535 |
| 4,318,068 | 3/1982 | Hori | 336/100 |
| 4,420,318 | 12/1983 | Cheng et al. | 62/542 |
| 4,457,769 | 7/1984 | Engdahl | 62/532 |
| 4,810,274 | 3/1989 | Cheng et al. | 62/532 |

OTHER PUBLICATIONS

Davis, Harold E.; Egan, Christopher J., "Use of Freeze Concentration Technology In Black Liquor Evaporation"; American Institute of Chemical Engineers Symposium Series, 1981, pp. 50-56.

Heist, James A., "Freeze Crystallization Applications for Waste-water Recycle and Reuse"; American Institute of Chemical Engineers Symposium Series, 1981, pp. 259-272.

Rousseau, Ronald W.; Sharpe, Emerson E., "Freeze Concentration of Black Liquor: Characteristics and Limitations"; Industrial Engineering Chemical Process Design Development, 1980, pp. 201-204.

Wiley, A. J.; Dambruch, Lyle E.; Parker, Peter E.; Dugal, Hardev S. "Treatment of Bleach Plant Effluents: A Combined Reverse Osmosis/Freeze Concentration Process"; Tappi Journal, Dec. 1978, pp. 77-80.

*Primary Examiner*—W. Gary Jones
*Assistant Examiner*—Charles K. Friedman
*Attorney, Agent, or Firm*—Willian Brinks Olds Hofer Gilson & Lione

[57] ABSTRACT

A method for treating a mechanical pulp plant effluent waste stream by freezing the effluent stream and separating frozen product. The frozen product contains between about 50 to 150 ppm chemical oxygen demand (COD), and may be reclaimed.

12 Claims, 2 Drawing Sheets

METHOD FOR TREATING MECHANICAL PULP PLANT EFFLUENT

CROSS-REFERENCE TO RELATED APPLICATION

This is a continuation in part of application Ser. No. 508,041, filed Apr. 11, 1990, now abandoned.

BACKGROUND OF THE INVENTION

The invention relates to the treatment of mechanical pulp waste effluent. More specifically, the invention relates to the application of freeze crystallization to purify mechanical plant effluent waste streams and to reclaim high purity water.

Mechanical pulp plant mills discharge waste streams which contain unacceptable quantities of contaminants such as inorganic salts, wood waste, organic materials, and volatile gases. The contaminants are commonly removed by concentrating the waste stream and separating the reclaimed effluent. Evaporation is a common concentration technique.

In evaporation, heat is applied to the waste stream to distill the reclaimed water. The heat, however, also distills contaminating organics and gases with the water. These contaminants are unacceptable, and secondary treatment of the distillate is necessary to recover high purity water. Thus, process water can be reclaimed only after these contaminants are removed from the distillate. After secondary treatment, reclaimed water can then be recycled to the pulping process, used in other processes, or discharged back to the environment.

It has been found, however, that mechanical pulp waste streams may be sufficiently concentrated by freezing the effluent. After freezing and separation, the resulting reclaimed water effluent is substantially higher in quality than the distillate from an evaporating process. Thus, the frozen reclaimed water effluent requires only minimal or no secondary treatment.

Accordingly, one advantage of the invention is that distillation of contaminants is avoided, thereby allowing high purity water to be recovered from mechanical pulp plant effluents. Further, the chemical oxygen demand (COD) in the reclaimed water may be brought down to zero more economically than known before. Also, low temperature treatment of the waste effluent reduces or eliminates corrosion of vessels and pumps experienced in the high temperature evaporator process.

SUMMARY OF THE INVENTION

The present invention provides a method for treating a mechanical pulp plant effluent waste stream by freezing the effluent stream and separating frozen product. In one embodiment, the mechanical pulp plant effluent waste stream is frozen to obtain a crystalline water product and a liquid waste concentrate. The crystalline water product may be reclaimed by washing away the liquid waste concentrate.

In another embodiment, the method contemplates indirectly cooling the mechanical pulp effluent waste stream and then crystallizing the cooled water to obtain a slurry containing a frozen product and a concentrate. The frozen product is separated from the concentrate, washed and then melted to obtain a high purity liquid.

In another embodiment, the method contemplates recycling at least a portion of the waste concentrate to the waste effluent stream.

DETAILED DESCRIPTION OF THE DRAWINGS AND PREFERRED EMBODIMENTS

The method of this invention may be applied to any effluent waste stream emitted by a mechanical pulp plant. Such mechanical pulp plants include those which primarily use mechanical energy to separate wood fibers from the wood matrix. Thus, mechanical pulp effluent waste includes waste generated from stone ground wood (SGW), pressurized ground wood (PGW), thermomechanical pulp (TMP), chemical thermomechanical pulp (CTMP), bleach chemical thermomechanical pulp (BCTMP), alkaline peroxide mechanical pulp (APMP), and like processes where the pulp yield is high and the amount of waste is relatively small.

Mechanical pulp effluent waste streams typically contain waste materials present in the wood stock fed to the process and any chemicals used in softening or processing the wood. These effluents are complex and very difficult to characterize, and are therefore customarily defined in the industry by their process source. Without limiting the invention, such wood waste may contain, for example, organic acids, volatile organics, resinous compounds, and lignins. Chemicals commonly used in a mechanical pulp process include inorganic salts such as sodium sulfite, sodium hydroxide, and sodium carbonate. The wood waste and process chemicals contaminate the mechanical pulp effluent, creating high saline, chemical oxygen demand (COD), and biological oxygen demand (BOD) levels. These waste materials may also make the waste stream toxic. Other wood waste and chemical contaminants, known to those skilled in the art but not mentioned here, are also contemplated.

In accordance with one embodiment, the mechanical pulp effluent waste treated by the present invention contains inorganic contaminants, such as salts, and organic contaminants. The organic materials include heavy organics, such as lignins, fatty acids, carbohydrates, and light organics, such as methanol. The mechanical pulp effluent waste treated by the invention typically contains high amounts of volatile organics, and preferably between about 0.1 to 2.0 percent by weight. These volatile organics generally have a boiling point between about 150 to 220° F. (65 to 104° C.) at ambient conditions and include, for example, volatile acids.

According to the process, the mechanical pulp waste effluent is treated at or near the freezing point, about 0 to 30° F. ($-17$ to $-1°$ C.), at ambient pressures. Preferably, the waste effluent is treated between about 10 to 25° F. ($-12$ to $-6°$ C.). The lower temperature parameter is limited by the freezing potential of the effluent as it moves through the equipment, such as the ice column. For example, the lower temperature may be limited by the freezing potential of the material during the washing step. Thus, the lower limit may be below 0° F. as long as the material being treated does not freeze or jam the equipment or otherwise obstruct the process.

Figure 1:
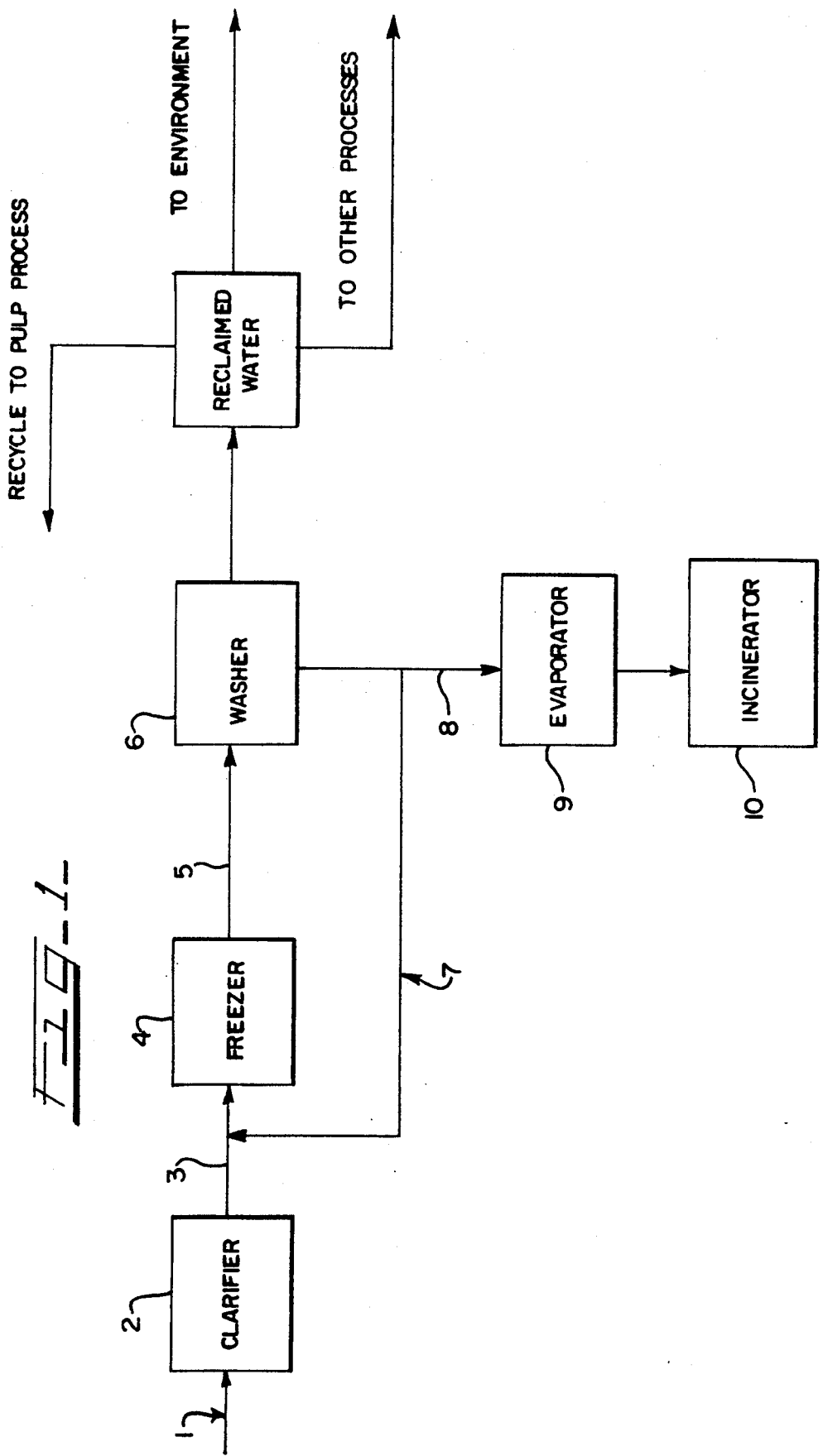
FIG. 1 is a process schematic of one embodiment of the present invention.

One embodiment of the invention is shown in FIG. 1. In this embodiment, waste effluent is first pretreated. In this case, the effluent in line 1 is pretreated in clarifier 2, but any pretreatment step known in the art is suitable. Pretreatment is not necessary to the process, but is employed to reduce high amounts of suspended solids in the waste effluent.

The pretreated effluent is pumped through line 3 to freezer 4, where a slurry containing a frozen product and a liquid concentrate is formed. The feed to the freezer 4 preferably contains no greater than 10 percent by weight total solids. As used herein, the term total solids means the sum of dissolved solids and suspended solids. Preferably, the feed contains total solids between about 1000 ppm to 10 percent by weight.

The product and concentrate are formed between the temperature range of about 0 to 32° F. ($-17$ to 0° C.) at atmospheric pressures. Preferably, the frozen product comprises crystalline water, or ice, and the liquid concentrate contains the contaminants. The crystalline water may contain between about 50 to 150 ppm chemical oxygen demand (COD). The crystalline water generally also may contain between about 50 to 150 ppm total dissolved solids (TDS).

The frozen product is then separated from the liquid concentrate. In this embodiment, the slurry is pumped through line 5 to washer 6 where the ice is washed by mechanical means with water under conditions to maintain the crystallinity. The ice, however, may be separated by any means known in the art including filtration and centrifugation. The ice is recovered, reused in the plant, including the pulping operation, or returned to the water source.

In this embodiment, a portion of the separated liquid concentrate is recycled in line 7 to line 3 which feeds freezer 4. The separated liquid concentrate may, of course, be recirculated in any amount sufficient for the process, and may be fed to any sufficient point, such as directly to the freezer. The contaminants in the remaining portion of separated liquid concentrate may be disposed of in any manner known in the art. In this instance, the liquid concentrate is fed through line 8 to evaporator 9 to further concentrate the contaminants. The contaminants are then burned in incinerator 10.

Figure 2:
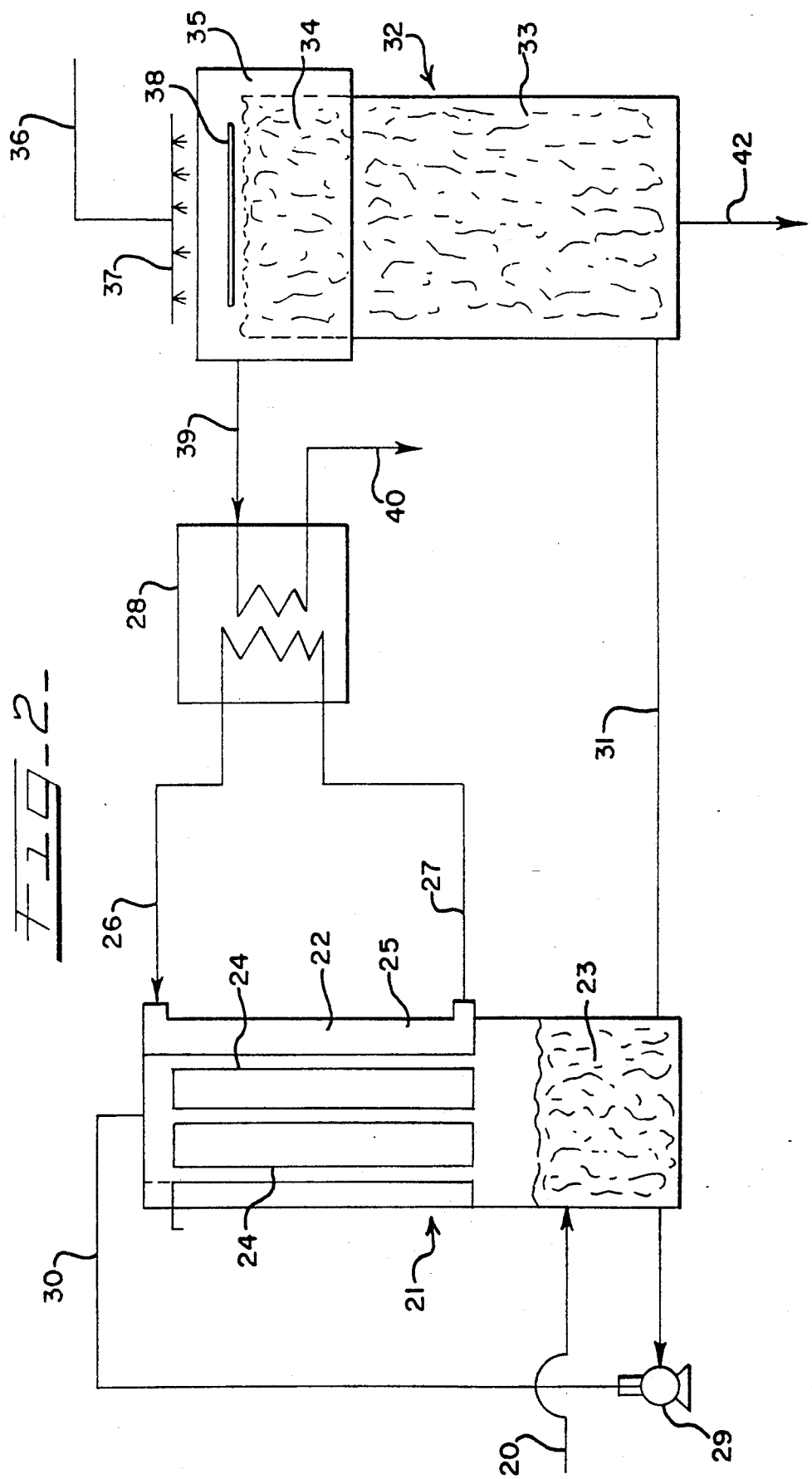
FIG. 2 is a process schematic of another embodiment of the present invention.

FIG. 2 illustrates another embodiment of the invention employing a continuous freezing process which forms an ice slurry. Waste effluent 20 is fed to freezer 21 which employs an indirect freezing process. Indirect freezing processes which may be employed are described in U.S. Pat. Nos. 4,286,436; 4,335,581; 4,457,769; 4,532,985, the teachings of which are incorporated herein. Here, freezer 21 contains a heat exchange section 22 and a slurry retention chamber 23. The heat exchange section 22 comprises tubes 24 and a shell 25, thereby forming a shell and tube heat exchanger. Refrigerant is fed to the shell in line 26 and returns to condenser 28 through line 27. The refrigerant may be any commonly employed refrigerant, such as ammonia or freon. While a shell and tube exchanger is illustrated here, any indirect cooling process is contemplated, including those described in the previously mentioned patents. Moreover, any acceptable refrigeration process, such as recirculating systems and pool boiling systems, may be employed.

Waste effluent is cooled within the tubes 24 close to the freezing point. Pump 29 recycles liquid back through the tubes 24 from the slurry retention chamber 23 through line 30. In this embodiment, frozen product does not form in the tubes 24, but instead forms in the slurry retention chamber 23. The frozen product preferably forms in chamber 23 by crystallizing upon contact with solid material which is present in the chamber. The solid material functions as a crystallizing seed and is preferably the frozen product of the slurry. During start-up, an appropriate seed material may be used to initiate crystallization of the frozen product. High purity crystalline water is preferred as a crystallizing seed.

The temperature in the slurry chamber 23 is preferably maintained at a temperature which will allow the above continuous freezing process to be carried out without hindrance. Preferably, the temperature is maintained between about 0 and 30° F. ($-17$ and 1° C.), more preferably between about 10 and 25° F. ($-12$ and $-6$° C.), and most preferably at the freezing point of the material. The slurry preferably contains between about 3 to 30 percent by weight of high quality ice, with the remaining portion being the liquid fraction. The liquid fraction, also known as the mother liquor, preferably contains between about 8 and 40, and most preferably between about 10 and 15, percent by weight total solids, with the remainder being water.

The slurry from the chamber 23 is fed through line 31, at a temperature of about 10° to 25° F. ($-12$° to $-6$° C.), and preferably at about 23° F. ($-5$° C.), to a washer column 32. The washer column 32 may be any suitable design, such as a gravity or a hydraulic piston design. Here, washer column 32 is a gravity design and contains a separation chamber 33, a washing chamber 34 and an annular melting chamber 35. The slurry is continuously fed to an inlet located near the bottom of the separation chamber 33, and the slurry travels upwardly into the washing chamber 34. The slurry concentrates as it proceeds upwardly, and preferably reaches a concentration in the washing chamber of about 75 to 90 percent by weight of high quality ice.

Wash liquid, which may be pure or recycled high quality water, is added to the top of the washer column 32 from line 36 and distributor 37. In the washer column 32, the wash liquid flows downwardly as the ice pack rises to the top of the washing chamber 34. At the top of the washing chamber 34, the ice pack is fed into by the annular melting chamber 35. The ice pack may be transferred to the melting chamber by any suitable transfer means, such as a rotating mechanical scraping blade 38.

The melting chamber 35 converts the high quality crystalline ice to high quality liquid water, and is preferably maintained at temperature of about 32° F. (0° C.). In accordance with FIG. 2, the high quality water is fed to condenser 28 through line 39 and there heat exchanged with the refrigerant. The heat exchanged high quality water is then reclaimed from line 40, and can be recycled to the pulping process, returned to the environment, or used in other processes as shown in FIG. 1.

Concentrate is drawn in line 42 from the separator chamber 33 and may recycled to the treating process or disposed of by evaporation or incineration, as illustrated in FIG. 1. The concentrate contains the contaminants which were present in the mechanical pulp plant effluent waste, including the volatile organics and heavy organics mentioned earlier.

Thus, the present invention employs a freeze separation technique for a mechanical pulp plant effluent waste stream that removes both volatile and heavy organics in the concentrate and yields a high quality reclaimable water. Moreover, when indirect freezing is employed, the volatile organics are prevented from contaminating the refrigerant. These and other advantages are illustrated in the examples.

EXAMPLES

Mechanical pulp plant effluent wastes having the compositions given in Table 1 were treated. Each effluent was fed to a continuous indirect freezer containing a shell and tube heat exchanger and slurry chamber. The slurry chamber was maintained at a temperature of about 25° F. (−6° C.), and the slurry contained 5 percent by weight ice. The slurry was fed to a washer column containing a separation chamber, a washing chamber and a melt chamber. High quality ice was collected from the washing chamber and melted in the melting chamber at a temperature of 34° F. (1° C.). The resulting high quality water in tests 1 to 5, contained between 10 to 100 ppm COD and averaged about 50 ppm COD. Concentrate was drawn from the bottom of the separation chamber and had the composition shown in Table 2.

TABLE 1

| ANALYSIS | TYPICAL WASTE FEED ANALYSIS | | | | |
|---|---|---|---|---|---|
| | 1 | 2 | 3 | 4 | 5 |
| pH | 10.2–10.5 | 8.4–8.8 | 6.1–6.4 | 6.3–7.6 | 5.7–6.8 |
| Conductivity | 8550 | 8500 | 5250 | 12000 | 7000 |
| Density | 1.02 | 1.02 | 1.02 | 1.015 | 0.0998 |
| Total Solids (%) | 1.33 | 1.98 | 1.16 | 2.6 | 1.88 |
| Ash (% of TS) | 48.1 | 37.5 | 36.1 | 40.1 | 32.5 |
| Suspended Solids (ppm) | 150 | 5390 | 1550 | 1750 | 2741 |
| C.O.D. (ppm) | 10000 | 18000 | 10000 | 28000 | 15000 |
| T.O.C. (ppm) | 3715 | 7863 | 3825 | 10200 | 5100 |
| Volatile Acids (ppm) | 4193 | 13826 | 9466 | 9060 | 5960 |
| Carbonate (ppm) | 1884 | 756 | 616 | | |
| Sulfate (%) | 0.04 | 0.12 | 0.09 | 1386 | 1340 |
| Sulfide (ppm) | 95 | 142 | 0.002 | | |
| Chloride (ppm) | | | 15 | 65 | 48 |
| Sodium (ppm) | 2822 | 3011 | 1550 | 3700 | 2000 |
| Calcium (ppm) | 55 | 68 | 105 | 101 | 184 |
| Potassium (ppm) | 13 | 27 | 155 | 60 | 42 |
| Magnesium (ppm) | 102 | 67 | 105 | 63 | 34 |
| Aluminum (ppm) | 8.1 | 1.7 | <1 | <5 | <5 |
| Silicon (ppm) | 156 | 171 | 749 | 570 | 0 |

TABLE 2

| | CONCENTRATE COMPOSITIONS | | | | |
|---|---|---|---|---|---|
| COMPONENT | 1 | 2 | 3 | 4 | 5 |
| Total Solids % | 9.5 | 10.5 | — | 14.5 | — |
| C.O.D. % | 7.14 | 9.54 | — | 15.6 | — |

The invention is not intended to be limited by the above preferred embodiments. Its full scope, however, is defined by the appended claims.

We claim:

1. A process for producing high purity water from a mechanical pulp plant effluent waste stream and recycling said water to the mechanical pulping process, said process comprising:
   a) indirectly cooling the effluent stream to a temperature near the freezing point of the stream;
   b) crystallizing a portion of the effluent stream to obtain a frozen product and a liquid concentrate;
   c) separating the frozen product from the liquid concentrate; and
   d) recovering and recycling a portion of the frozen product to the mechanical pulping process.

2. The method of claim 1 where the frozen product is separated from the liquid concentrate by gravity.

3. The method of claim 1 further comprising recycling the separate frozen product to the pulping process.

4. The method of claim 1 further comprising recycling at least a portion of the separated liquid concentrate to the effluent waste stream.

5. The method of claim 1 where the separated liquid concentrate is further concentrated by evaporation.

6. The method of claim 1 where the separated liquid concentrate is incinerated.

7. The method of claim 1 where the effluent waste stream comprises SGW, PGW, TMP, CTMP, BCTMP, or APMP plant effluent waste streams.

8. The method of claim 1 where the frozen product comprises crystalline water.

9. The method of claim 1 where the frozen product contains between about 50 to 150 ppm COD.

10. A method for treating a mechanical pulp plant effluent waste stream and recycling a portion of the stream to the mechanical pulping process, said process comprising:
    a) cooling the effluent stream by indirect means to a temperature near the freezing point of the stream;
    b) crystallizing the cooled effluent stream to obtain a crystalline water product and a liquid waste concentrate;
    c) separating the crystalline water product from the liquid waste concentrate; and
    d) recovering and recycling a portion of the crystalline water product to the mechanical pulping process.

11. The method of claim 10 wherein the crystalline water product is concentrated during separation and washing.

12. The method of claim 10 further comprising melting the crystalline water product after the product is washed.

* * * * *

UNITED STATES PATENT AND TRADEMARK OFFICE
CERTIFICATE OF CORRECTION

PATENT NO. : 5,174,859
DATED : December 29, 1992
INVENTOR(S) : Timothy J. Rittof et al.

It is certified that error appears in the above-indentified patent and that said Letters Patent is hereby corrected as shown below:

Column 6,
In Claim 3, line 2, delete "separate" and substitute --separated--.

Signed and Sealed this

Twenty-second Day of November, 1994

Attest:

BRUCE LEHMAN

*Attesting Officer*  *Commissioner of Patents and Trademarks*